United States Patent Office 3,132,643
Patented May 12, 1964

3,132,643
BLOOD PRESSURE MEASUREMENT
Jerome N. Baum, Alexandria, and Milton J. Fivel, Falls Church, Va., assignors to Melpar, Inc., Falls Church, Va., a corporation of Delaware
Filed Aug. 18, 1960, Ser. No. 50,400
8 Claims. (Cl. 128—2.05)

The present invention relates generally to systems for measuring blood pressure, and more particularly to systems for measuring blood pressure in terms of time elapse between an electro-cardiac signal and a pressure signal generated at a pressure point in the body.

It has long been known that blood pressure in animals and humans can conveniently be measured in terms of elapse of time between pressure pulses at two separated points along a blood vessel, as well as by conventional methods involving a catheter or a pneumatic cuff and a stethoscope. The latter methods are conventionally employed by physicians, but involve discomfort to the patient, or manual manipulation and visual observation by a relatively skilled observer. They do not readily lend themselves to measurements on an animal or human in course of locomotion or movement, nor to telemetering of blood pressure information.

The method of measuring blood pressure which involves measurement of time interval between pressure peaks at two separated points along a blood vessel possesses the disadvantage in practice that these two points may be closely spaced, and hence that the time elapse is short relative to the durations of the pulses. These pulses, moreover, have long rise times and no clear cut reference point, tend to be irregularly shaped and are affected by and interspersed with pressure changes due to body movements, muscular tensions, breathing, and the like. At least one of the two measurement positions is not at a pressure point, and hence involves either two low amplitude time dispersed pulses, or involves a low variational pressure measurement and a high variational pressure measurement which tends to mask the former. This method has therefore not found favor in practice, although in theory it appears to have advantages.

According to the present invention, blood pressure is measured in terms of time elapse between an electro-cardiac signal and a consequent pressure pulse as measured at a pressure point in the body.

The electro-cardiac signal is relatively precise, e.g. it has a wave form having sharply defined wave fronts. Therefore, a precise starting time for time elapse measurement is available. The pressure point measurement can be taken at any convenient pressure point, such as the wrist or shoulder. On the assumption that a pressure point is used for pressure measurements, a strong pulse of pressure is available, which is well separated from the cardiac pulse in time. The wrist, for example, is sufficiently far from the heart along the blood vessels, and the pressure point is sufficiently well defined and localized, that the time required to transfer a pressure pulse from the heart to the pressure point at the wrist, which is far greater than the duration of a pulse at the wrist, can be accurately established. Errors due to magnitude of pulse duration are therefore small, as a percentage of time elapse measurement, and failure to precisely identify significant points in the pulse shape have no significant effect on the ultimate result.

As a further improvement, we utilize gating circuits responsive to the cardiac pulses, for gating out undesired responses of the system for most of the time interval during which a succeeding pressure pulse should normally not be available. These undesired responses represent noise, and tend to degrade the measurement.

It is, accordingly, a primary and general object of the present invention to provide a system for measuring blood pressure.

It is a more specific object of the invention to provide a system for measuring blood pressure in terms of time elapse between an electro-cardiac signal and a pressure signal in a blood vessel, taken at a pressure point.

Still another object of the invention resides in the provision of a system for measuring blood pressure in which noise signals generated in the body are eliminated from the measurements.

The above and still further objects, features and advantages of the present invention will become apparent upon consideration of the following detailed description of one specific embodiment thereof, especially when taken in conjunction with the accompanying drawings, wherein.

Figure 1:
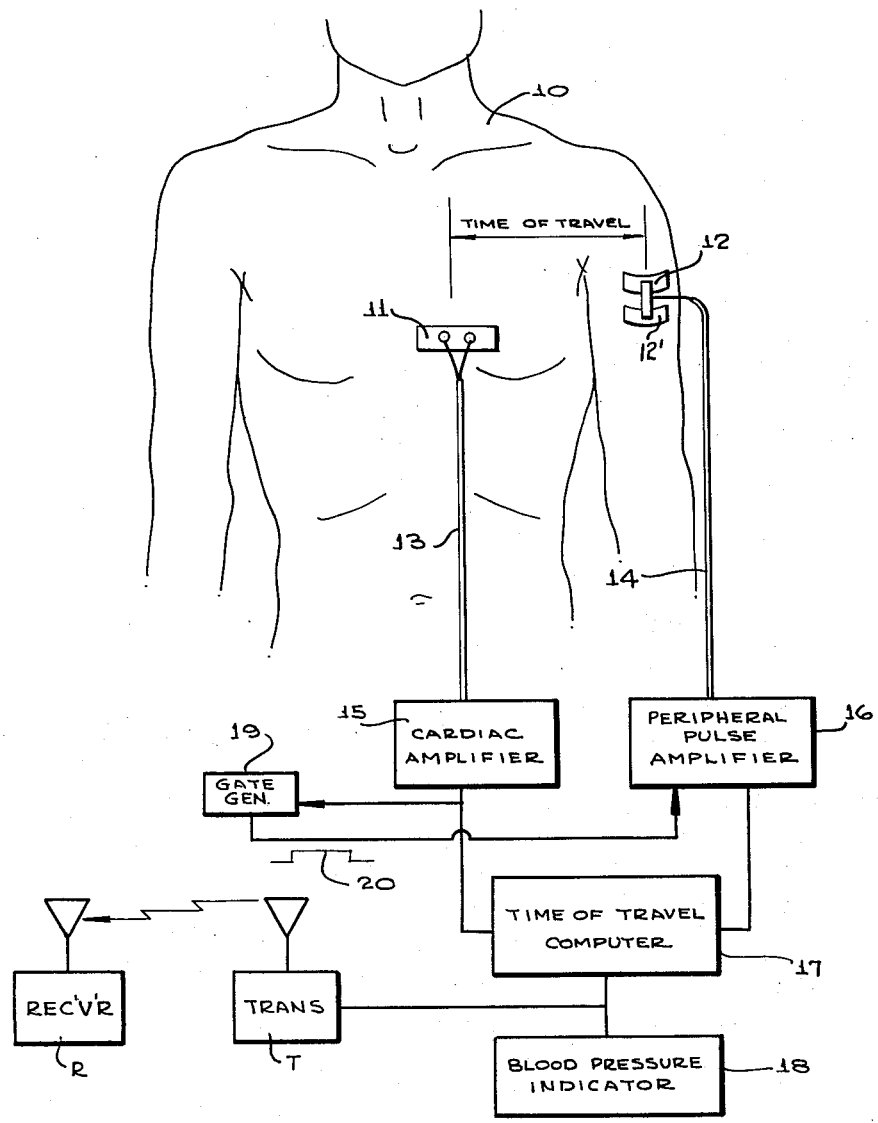
FIGURE 1 is a block diagram of a system according to the present invention.

Referring now to the accompanying drawings, the reference numeral 10 denotes pertinent parts of the human body, to which are applied cardiac electrodes 11 and peripheral pressure pulse detector electrodes 12 and 12', which supply signals in electrical form to leads 13 and 14, respectively. Detector electrode 12' is spaced along the artery on which the pressure pulse is being measured to provide accurate measurements, as seen infra. The leads 13 proceed to a cardiac amplifier 15 and the leads 14 to a peripheral pulse amplifier 16. The amplifiers 15 and 16 amplify the pulses supplied thereto to suitable levels, and provide amplified pulses to a time elapse computer 17. The latter may be of conventional character per se, and may be completely electronic, translating time between pairs of pulses into an electrical signal, for application to indicator 18, which when properly calibrated provides a visual indication of blood pressure.

The output of cardiac amplifier 15 initiates operation of a gate wave generator 19, for application to pulse amplifier 16. The off-gate wave 20 is selected to be sufficiently long to gate out all signals, between time $t_1$ and time $t_2$, at which pulses representing peripheral pressure increases may be expected. This implies that gate wave generator 19 generates gating waves, 20, of fixed, but adjustable duration.

If desired, the output of time of travel computer 17 may be telemetered to a remote location, by means of conventional telemeter equipment, comprising transmitter T and remote receiver R.

Figure 2:
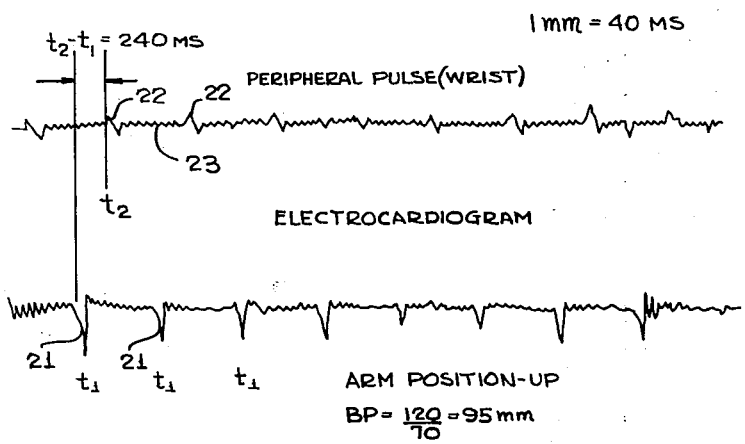
FIGURES 2 and 3 are time plots of electro-cardiac and pressure pulses measured on a typical human.
Figure 3:
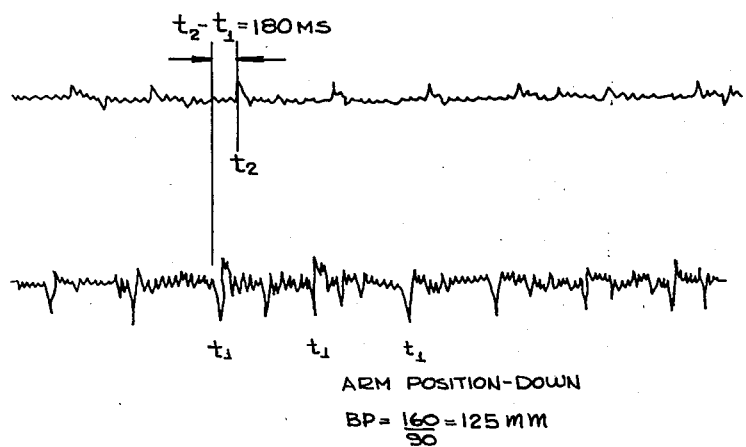

Referring to FIGURES 2 and 3, cardiac pulses 21 in the form of electrical signals are generated at times $t_1$. These are relatively irregular in amplitudes, but are sharply defined in time. Pressure pulses 22 occur at times $t_2$. These are less sharply defined than are the cardiac pulses, and are separated by noise 23, caused largely by bodily and muscular movements, breathing and the like. The fact that pressure pulses, according to the present invention, are derived at pressure points provides assurance that the pulses 22 will exceed the noise 23, by amounts adequate to insure correct measurement. It is noted that in response to any cardiac pulse occurring at $t_1$, a pressure pulse occurs at $t_2$ before the next cardiac pulse is generated.

It may be noted, from consideration of FIGURES 2 and 3 that typical elapsed times $t_2-t_1$ vary from 180 ms.

when the subjects arm is down, to 240 ms. when the arm is up. The difference occurs because the total pressures applied to the blood in the two cases, composed of (1) pressure provided by the heart and (2) gravitational pressure, are different in the two cases, and the velocity of flow of blood is a direct function of total pressure. However when a subject has been tested by the present system, in respect to one typical body position, with the subject at rest and relaxed, the measurement is reproducible, and can be calibrated by comparison with results of conventional methods of measuring blood pressure. Any deviation in measurements is then assignable to changes in blood pressure which may have physical or emotional origins. The present system is not capable of making absolute measurements of pressure, a given time reading having different pressure significance in different subjects. Further time readings are affected by the condition of the subject's blood vessels and heart, so that calibration for each individual is required.

While a simple gate has been shown and described, for gating out noise or undesired signal in the times when no desired signal is present, it is within the spirit of the invention to utilize more complex gating systems. Many such gating systems are known in the radar art, which provide adjustable receiver gates, and wherein the gates automatically follow or track on incoming pulses. The range tracking gating techniques common in the radar art are applicable to the present invention, wherein the problem is analogous to that of radar, i.e. measurement of time elapse between pulses.

It is known that the method of the invention provides a measurement of average pressure or essentially the difference between systolic and diastolic pressures.

While mean pressure can be measured by means of a device for providing a pulse in response to an electro-cardiac signal, and a further pulse in response to a pressure point signal, a further possibility is to take two sets of measurements of pressure at two successive points 12 and 12' along an artery, where no branch points exist.

If the time of an electro-cardiac pulse is $t_1$ and the times of the pressure pulses deriving from transducers 12 and 12' are $t_2$ and $t_3$ (the latter not being shown on the drawings) respectively, and if $t_3-t_1$, and $t_2-t_1$ are measured, then flow is proportional to $t_3-t_2$; or to $(t_3-t_1)-(t_2-t_1)$. The pressure pulses occurring at times $t_2$ and $t_3$ are coupled from amplifier 16 to computer 17 which computes the intervals $(t_1-t_2)$ and $(t_1-t_3)$ and then provides a measure of the difference between the separate intervals. In this manner pressure gradient along a short length of artery can be measured, but the advantages of the present invention retained.

It will also be appreciated that a wide variety of devices for measuring passage of a pulse of pressure past a given arterial point are feasible. These include strain gages, photo-electric sensing of ear lobes, finger tip measurements and the like, i.e. the invention is not limited to any specific method of measuring passage of a pressure pulse.

While we have described and illustrated one specific embodiment of the present invention, it will become apparent that variations of the specific details of construction may be resorted to without departing from the true spirit and scope of the invention as defined in the appended claims.

What we claim is:

1. A system for measuring blood pressure, comprising means for detecting a first cardiac electrical signal generated in response to a heart beat, means for detecting a peripheral pressure pulse generated in response to said heart beat, means for translating said pressure pulse into a second electrical signal constituting a substantial replica of said pressure pulse, means responsive to said first electrical signal for detecting the occurrence time of a predetermined characteristic of said cardiac electrical signal, said predetermined characteristic occurring only once for said heart beat, means responsive to said second electrical signal for detecting the occurrence time of a predetermined wave segment of said pressure pulse, said predetermined wave segment occurring only once for said heart beat, and means responsive to said two last mentioned means for measuring the time interval between the occurrence itmes of said predetermined characteristic and of said predetermined wave segment.

2. The combination according to claim 1 wherein said means for measuring includes an elapsed time computer responsive to said first and second signals.

3. The system of claim 1 further including means responsive to said first signal for gating out noise occurring in the interval between said occurrence time.

4. A method for measuring blood pressure comprising the steps of generating an electro-cardiac signal in response to a heart beat, generating a further electrical signal that is a replica of and in response to a pressure pulse occurring in a blood vessel in response to said heart beat, detecting the occurrence time of a predetermined characteristic of said electro-cardiac voltage, said predetermined characteristic occurring only once for said heart beat, detecting the occurrence time of a predetermined wave segment of said pressure pulse, said wave segment occurring only once for each heart beat, and measuring the time interval between the occurrence times of said predetermined characteristic and predetermined wave segment.

5. The method according to claim 4 wherein said pressure pulses are measured at pressure points.

6. A system for measuring mean blood pressure comprising means for detecting the electro-cardiac voltage generated by the heart in response to one beat, means for translating said voltage into an electrical signal that is a replica of said voltage, means responsive to said signal for detecting the occurrence time of a predetermined characteristic of said electro-cardiac voltage, said predetermined characteristic occurring only once for each heart beat, means for detecting the passage of a pulse of arterial pressure past one predetermined point along an artery, said pressure pulse occurring in response to said heart beat, means responsive to said last named detecting means for detecting the occurrence time of a predetermined wave segment occurring only once for said heart beat, and means responsive to both of said occurrence time detecting means for measuring the interval between the occurrence time of said predetermined characteristic and said predetermined wave segment.

7. A method of measuring the pressure gradient along a short length of artery between which no branch points exist, comprising the steps of detecting the electro-cardiac voltage generated by the heart in response to a heart beat, detecting the occurrence time of a predetermined characteristic of said electro-cardiac voltage, said predetermined characteristic occurring only once for said heart beat, detecting a first pressure pulse at a first point along said length of artery, detecting a second pressure pulse at a second point along said length of artery, said pressure pulses being derived in response to said heart beat, detecting the occurrence time of a predetermined waveshape of said first pressure pulse, said predetermined waveshape of said first pressure pulse occurring only once in response to said heart beat, detecting the occurrence time of a predetermined waveshape of said second pressure pulse, said predetermined waveshape of said second pressure pulse occurring only once in response to said heart beat, measuring the interval between the occurrence time of said predetermined characteristic and the occurrence time of the first pressure pulse of said heart beat, measuring the interval between the occurrence time of said predetermined characteristic and the occurrence time of the predetermined waveshape of the second pressure pulse for said heart beat, and measuring the difference between said intervals.

8. A method of measuring blood pressure comprising the steps of detecting the occurrence time of a predetermined characteristic of an electro-cardiac voltage generated in response to a heart beat, said characteristic occurring only once in response to said heart beat, detecting the time of occurrence of a predetermined wave segment of a pressure pulse generated at a peripheral pressure point in response to said heart beat, said wave segment occurring only once in response to said heart beat, and measuring the time interval between the occurrence times of said predetermined characteristic and said predetermined wave segment.

References Cited in the file of this patent

UNITED STATES PATENTS

| | | |
|---|---|---|
| 2,658,505 | Sheer | Nov. 10, 1953 |
| 2,821,188 | Pigeon | Jan. 28, 1958 |
| 2,827,040 | Gilford | Mar. 18, 1958 |
| 2,875,750 | Boucke | Mar. 3, 1959 |
| 2,944,542 | Barnett | July 12, 1960 |
| 3,051,165 | Kompelien | Aug. 28, 1962 |

FOREIGN PATENTS

| | | |
|---|---|---|
| 141,046 | Sweden | Aug. 2, 1950 |